US009996602B2

(12) United States Patent
Chong et al.

(10) Patent No.: US 9,996,602 B2
(45) Date of Patent: Jun. 12, 2018

(54) GENERATING A VIRTUAL DYNAMIC REPRESENTATIVE OF A TAXONOMIC GROUP WITH UNIQUE INHERITANCE OF ATTRIBUTES

(71) Applicant: International Business Machines Corporation, Armonk, NY (US)

(72) Inventors: Elvina Chong, Sarawak (MY); Nitin Gupta, Amritsar (IN); Ravi Kumar Reddy Kanamatareddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 14/594,541

(22) Filed: Jan. 12, 2015

(65) Prior Publication Data
US 2016/0203204 A1 Jul. 14, 2016

(51) Int. Cl.
*G06F 7/00* (2006.01)
*G06F 17/30* (2006.01)

(52) U.S. Cl.
CPC .. *G06F 17/30592* (2013.01); *G06F 17/30566* (2013.01)

(58) Field of Classification Search
CPC ......... G06F 17/30592; G06F 17/30566; G06F 17/30584; G06F 3/0646; G06F 3/0655
USPC .......................... 707/749, 751, 737, 999.107
See application file for complete search history.

(56) References Cited

U.S. PATENT DOCUMENTS

| 5,404,513 | A  | * | 4/1995  | Powers ............. G06F 17/30327 |
| 6,868,525 | B1 | * | 3/2005  | Szabo ............... G06F 17/30067 |
|           |    |   |         | 705/14.53 |
| 7,181,438 | B1 | * | 2/2007  | Szabo ............... G06F 17/30522 |
| 7,392,255 | B1 | * | 6/2008  | Sholtis ............. G06F 17/30566 |
| 7,689,625 | B2 |   | 3/2010  | Westerinen et al. |
| 7,788,265 | B2 |   | 8/2010  | Morscher et al. |
| 8,085,693 | B2 |   | 12/2011 | Ristock |
| 8,438,170 | B2 | * | 5/2013  | Koran .................... G06Q 30/02 |
|           |    |   |         | 707/748 |

(Continued)

OTHER PUBLICATIONS

Kracklauer et al., Collaborative Customer Relationship Management, 2004, Book, 273 pages.

(Continued)

*Primary Examiner* — Mohammed R Uddin
(74) *Attorney, Agent, or Firm* — Schmeiser, Olsen & Watts, LLP; John Pivnichny

(57) ABSTRACT

A method and associated systems for generating a virtual dynamic representative of a taxonomic group with unique inheritance of attributes. Each record of a continuously updated database identifies a "vertical" attribute of an entity associated with that record, and further identifies a "horizontal" attribute upon which a business decision may be based. An account-management apparatus selects a subset of these records that are associated with a particular value of the vertical attribute and identifies the most desirable value of the horizontal attribute that is associated with any of the selected records. The apparatus then creates a virtual representative of the subset that represents the subset as a taxonomic group associated with the particular value of the vertical attribute and associates all records of the group with the most desirable value of the horizontal attribute.

20 Claims, 6 Drawing Sheets

(56) References Cited

U.S. PATENT DOCUMENTS

| | | | |
|---|---|---|---|
| 9,067,145 B2 | 6/2015 | Sofman et al. | |
| 9,524,482 B2 | 12/2016 | Yopp et al. | |
| 2002/0087510 A1* | 7/2002 | Weinberg | G06F 17/243 |
| 2002/0116417 A1* | 8/2002 | Weinberg | G06F 17/243 |
| | | | 715/212 |
| 2003/0050915 A1* | 3/2003 | Allemang | G06F 17/30731 |
| 2004/0044677 A1* | 3/2004 | Huper-Graff | G06Q 30/02 |
| 2004/0193514 A1* | 9/2004 | Kasravi | G06F 17/30607 |
| | | | 705/30 |
| 2007/0005598 A1* | 1/2007 | Okamoto | G06F 7/24 |
| 2007/0239535 A1* | 10/2007 | Koran | G06Q 30/02 |
| | | | 705/14.25 |
| 2007/0276858 A1* | 11/2007 | Cushman | G06F 17/30303 |
| 2009/0112913 A1* | 4/2009 | Murthy | G06F 17/30312 |
| 2010/0114654 A1* | 5/2010 | Lukose | G06Q 30/0256 |
| | | | 705/14.54 |
| 2010/0119053 A1* | 5/2010 | Goeldi | G06Q 10/00 |
| | | | 379/265.09 |
| 2011/0208759 A1* | 8/2011 | Zellweger | G06F 17/30398 |
| | | | 707/754 |
| 2011/0295895 A1* | 12/2011 | Musgrove | G06F 17/30327 |
| | | | 707/777 |
| 2012/0054213 A1* | 3/2012 | Puttaswamy | G06Q 30/0201 |
| | | | 707/758 |
| 2013/0204711 A1* | 8/2013 | Worthen | G06Q 30/0269 |
| | | | 705/14.66 |
| 2015/0012350 A1* | 1/2015 | Li | G06Q 30/0243 |
| | | | 705/14.42 |
| 2015/0363478 A1* | 12/2015 | Haynes | G06Q 10/101 |
| | | | 707/625 |
| 2016/0092487 A1* | 3/2016 | Upadhyaya | G06F 17/30371 |
| | | | 707/694 |

OTHER PUBLICATIONS

Silvio Wilde, Customer Knowledge Management, 2011, Book, 143 pages.

Chris Todman, Designing a Data Warehouse, 2000, Book, 323 pages.

Francis Buttle, Customer Relationship Management—Concepts and Technologies, 2009, 500 pages.

Celecom-IBM, Single Customer View Technical Design Document, Oct. 7, 2014, 32 pages plus cover.

Corey Pierson, Customer Lifetime Value techniques: why you need to be careful with cohort analysis, Sep. 12, 2014, 4 pages.

Torio et al., Using Cohort Analysis to Optimize Customer Experience, UX Magazine, Article No. 956, Feb. 12, 2013, Retrieved Sep. 12, 2014, 9 pages.

Martin L. Christoffersen, Cladistic Taxonomy, Phylogenetic Systematics, and Evolutionary Ranking, Syst. Biol 44(3):440-454, 1995, Systematic Biology.

Ashlock et al., On Taxonomy of Evolutionary Computation Problems, 0-7803-8515-2/04 copyright 2004, IEEE, pp. 1713-1719.

Calegari et al., A Taxonomy of Evolutionary Algorithms in Combinatorial Optimization, Journal of Heuristics, 5, 145-158, 1999.

* cited by examiner

GENERATING A VIRTUAL DYNAMIC REPRESENTATIVE OF A TAXONOMIC GROUP WITH UNIQUE INHERITANCE OF ATTRIBUTES

TECHNICAL FIELD

The present invention relates to creating virtual representations of a customer base.

BACKGROUND

A business or other organizational entity may need to manage one or more groups of heterogeneous entities, such as customers, suppliers, marketing targets, or other types of group members, where each group member may be associated with time-varying values of one or more parameters. Some of these parameters may identify characteristics of the members, such as a geographic location or a type of participation in a social network, that make it possible to organize those members into groups.

These characteristics, however, may not be as useful to the business or entity as are other parameters that describe behavioral patterns or business indicators of the group members, such as a previous buying pattern, a length of association with a business or entity, prior use of a particular distribution channel, or gross income. In many cases, parameters that may be used to select desirable members of a group may be independent of or distinct from parameters that identify the information about group members that is of ultimate interest to a business.

These group-management tasks may be made even more complex if values of these parameters are free to vary over time, or if values associated with group-member records have not been recently updated or confirmed. In such cases, organizing large numbers of group members in a meaningful or efficient way may be impossible.

In one example, consider a business that hopes to mine information from customer records that identify twenty years of transactions. Some of these records may identify behavioral characteristics of customers, such as shopping patterns or household income, that have not been updated or verified for decades. It would be hard to use such records to accurately identify customers that are likely to consider purchasing a new product line.

Other factors may render such methods even less reliable. A business's customer-management models, procedures, or goals may have evolved over the last twenty years such that information recorded by means of a different data-collection mechanism may not be relevant to a present model or methodology, and information required by current mechanisms may not have been recorded during earlier transactions.

In some cases, a business's customer records may inadvertently identify a transaction, customer, or account more than once, such that duplicate records inadvertently identify a single customer or transaction as two distinct entities. Many other types of implementation-dependent or business-dependent inaccuracies may exist.

These types of problems are common in efforts that span one or more business functions that may include, but are not limited to, marketing, sales, human resources, and customer service. When developing a marketing strategy, for example, a targeted advertising campaign may be effective only if potential customers can be accurately characterized in ways that indicate a likelihood that the customers will respond in a desired way to advertising delivered at a particular time through a particular channel. Outdated, redundant, inconsistently formatted, or otherwise-unreliable records make such problems difficult to solve.

Any solution to such problems may have to satisfy other constraints, that may include, but are not limited to:

a requirement that existing group-member profiles and transaction histories, stored in one or more databases, data warehouses, or other types of information repositories, not be disturbed in a way that might affect other systems that access that stored data;

a requirement that existing systems, procedures, methods, customer-management tools, or other resources of the business or other entity are not forced to undergo alteration;

a need to optimize a view of group members presented by the solution, as a function of an existing business rule or a goal of the business or of an other entity; or an ability to make available a result of the solution, as a multidimensional cohort analysis, to enterprise data-warehouse, business-intelligence, and other critical management systems.

All of these challenges are exacerbated in real-world business systems, which may comprise hundreds of thousands of records scattered across multiple, heterogeneous, distributed information repositories, some or all of which may have been updated at different or unknown times or may not have been updated at all within an acceptable period of time.

Traditional management tools do not satisfy these requirements. Existing Customer Relationship Management (CRM) systems, for example, may provide tools for characterizing and managing single customers, but they do not organize customers into taxonomic groups of members that share common member-related characteristics, nor can they aggregate and analyze members of such groups in an efficient way. In particular, CRM systems do not provide a way to manage group-specific behaviors or allow inheritance of such behavioral characteristics, or other parameters, by a dynamic group representative.

Some CRM systems do allow multiple customers to be managed as a single hierarchical account, but even those do not provide an ability to aggregate those customers into a more easily managed single entity as a function of inherited, time-varying member characteristics that are distinct from other characteristics by which the group is populated.

There is thus a need for a way to identify, organize, and characterize large groups of entity records, where the entities are each associated with one or more values of parameters that may have varying degrees of relevance to a goal of the business or other entity, where values of those parameters may change over time, and where stored accessible values of those parameters may be aged, inconsistent, or incorrect.

BRIEF SUMMARY

A first embodiment of the present invention provides a computerized account-management apparatus comprising a computer processor, a memory coupled to the processor, a computer-readable hardware storage device coupled to the processor, and a specialized interface to an account-management system, such that the interface allows the apparatus to access a continuously updated database of account records, and wherein the storage device contains program code configured to be run by the processor via the memory to implement a method for generating a virtual dynamic representative of a taxonomic group with unique inheritance of attributes, the method comprising:

the apparatus identifying a first vertical parameter and a first horizontal parameter, wherein each record of the database of account records is capable of identifying a value of the first vertical parameter and a value of the first horizontal parameter;

the apparatus retrieving a first subset of records from the database as a function of the first vertical parameter;

the apparatus assembling a first set of values of the first horizontal parameter, wherein each value of the first set of values is associated with a record of the first subset of records;

the apparatus selecting a first most desirable value of the first horizontal parameter from the first set of values;

the apparatus creating a first virtual record that represents the first subset of records; and the apparatus configuring the first virtual record to identify a first value of the first vertical parameter and to further identify the first most desirable value.

A second embodiment of the present invention provides a method for generating a virtual dynamic representative of a taxonomic group with unique inheritance of attributes, the method comprising:

a computerized account-management apparatus identifying a first vertical parameter and a first horizontal parameter, wherein the apparatus comprises a computer processor, a memory coupled to the processor, a computer-readable hardware storage device coupled to the processor, and a specialized interface to an account-management system, such that the interface allows the apparatus to access a continuously updated database of account records, and wherein the storage device contains program code configured to be run by the processor via the memory to implement a method, and wherein each record of the database of account records is capable of identifying a value of the first vertical parameter and a value of the first horizontal parameter;

the apparatus retrieving a first subset of records from the database as a function of the first vertical parameter;

the apparatus assembling a first set of values of the first horizontal parameter, wherein each value of the first set of values is associated with a record of the first subset of records;

the apparatus selecting a first most desirable value of the first horizontal parameter from the first set of values;

the apparatus creating a first virtual record that represents the first subset of records; and the apparatus configuring the first virtual record to identify a first value of the first vertical parameter and to further identify the first most desirable value.

A third embodiment of the present invention provides a computer program product, comprising a computer-readable hardware storage device having a computer-readable program code stored therein, the program code configured to be executed by a computerized account-management apparatus to implement a method for generating a virtual dynamic representative of a taxonomic group with unique inheritance of attributes, wherein the apparatus comprises a computer processor, a memory coupled to the processor, a computer-readable hardware storage device coupled to the processor, and a specialized interface to an account-management system, such that the interface allows the apparatus to access a continuously updated database of account records, the method comprising:

the computerized account-management apparatus identifying a first vertical parameter and a first horizontal parameter, wherein the storage device contains program code configured to be run by the processor via the memory to implement a method, and wherein each record of the database of account records is capable of identifying a value of the first vertical parameter and a value of the first horizontal parameter;

the apparatus retrieving a first subset of records from the database as a function of the first vertical parameter;

the apparatus assembling a first set of values of the first horizontal parameter, wherein each value of the first set of values is associated with a record of the first subset of records;

the apparatus selecting a first most desirable value of the first horizontal parameter from the first set of values;

the apparatus creating a first virtual record that represents the first subset of records; and the apparatus configuring the first virtual record to identify a first value of the first vertical parameter and to further identify the first most desirable value.

DETAILED DESCRIPTION

Figure 1:
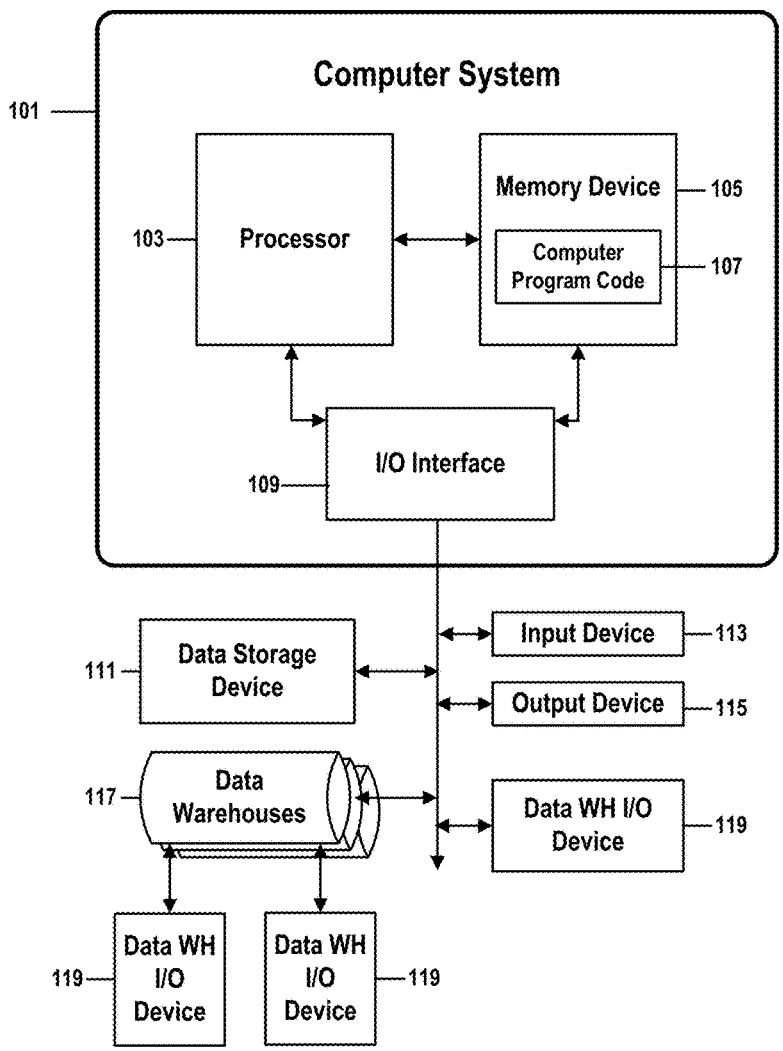
FIG. 1 shows a structure of a computerized account-management apparatus that may be used to implement a method and associated systems for generating a virtual dynamic representative of a taxonomic group with unique inheritance of attributes in accordance with embodiments of the present invention.

Embodiments of the present invention solve the problems listed above by providing an automated way to organize entities into taxonomic groups and to efficiently manage those groups by creating a self-updating virtual dynamic representative of each such group.

We refer to these groups as "taxonomic" in reference to similar methods of classification used in the biological sciences to organize a population into a hierarchical taxonomy. In such a taxonomy, a group (such as an order, genus, or species) may be populated by individual members that share a common, measurable characteristic.

In embodiments of the present invention, a taxonomic group (and its virtual representative) may likewise be identified by one or more shared characteristics (that is, by a specific value of one or more "vertical" parameters), such as a social security number, geographical location, or household income. As in a traditional taxonomy, if a first taxonomic group is higher in a hierarchical taxonomy than a second taxonomic group, a first vertical parameter that identifies the first taxonomic group may be broader than a second vertical parameter that identifies the second taxonomic group.

Embodiments of the present invention further associate each member of a taxonomic group with one or more member-specific "horizontal" characteristics, where each horizontal characteristic may be represented or stored as a value of a corresponding "horizontal" parameter. In most embodiments, a parameter may not be classified as both "vertical" and "horizontal."

Embodiments also define an automatic inheritance mechanism, by which a virtual representative of a taxonomic group may inherit a horizontal value associated with one or more members of the group. In embodiments described in this document, this inherited horizontal value may the value that is deemed to be the "most desirable" of any of the values associated with group members.

This inheritance mechanism may, in some embodiments, be deemed to be dynamic or automated. That is, once an embodiment organizes a population of records or other data elements into a virtual dynamic taxonomy based on one or more vertical parameters, the horizontal values associated with each virtual representative of each group may be updated in response to a change in an original source record or data element. Furthermore, the membership of each group may also be automatically or dynamically updated in response to a change in an original source record or data element.

Embodiments of the present invention may be applied to any sort of entities that have measurable characteristics and may be incorporated into any sort of application that requires a way to organize, quantify, analyze, query, update, or perform a function upon heterogeneous entities identified by parameters that may change over time. In some real-world implementations, these entities may be stored in different formats, on different platform, by different business functions, at different physical locations, or maintained by different systems.

In order to simplify the explanation of embodiments and examples of the present invention, this document will refer to such embodiments and examples as a way for businesses to manage customer-account records. But this pedagogical mechanism thus should not be construed to imply that embodiments of the present invention are limited to business entities or to customers of a business entity.

In such examples, vertical parameters might include identifying characteristics of each customer that allow the system to identify, select, and organize customer records, while "horizontal" characteristics, inherited by virtual representatives upward through levels of a hierarchical taxonomy, might identify characteristics of the customer records upon which a business decision may be based.

A choice of which parameters to deem "vertical" and which to deem "horizontal" in a particular embodiment may be all or partially implementation-dependent, or may be based all or in part upon specific business needs or goals of the embodiment. Regardless of how the parameters are identified, selected, or organized, the vertical parameters will be used to select members of each group and the horizontal parameters will be used to develop a "virtual" group member that embodies specific values of the horizontal parameters associated with the group.

In more advanced embodiments, many taxonomic groups may be identified in a similar manner, and each of these groups may be represented by an associated virtual group member (or "moderator"). These groups may be nested into a hierarchy, much as groupings of individuals may be organized into a nested hierarchy in a biological or botanical taxonomy. In some embodiments, all groups may not be associated with the same choice of horizontal or vertical parameters.

This organizational method provides technical advantages that solve the problems identified above in the "BACKGROUND" section by means of a novel combination of features that allow embodiments to create and occasionally or continuously update each group member or virtual representative. In multi-level hierarchical taxonomies, an update to a horizontal value may be inherited vertically between two nested groups, from a virtual representative or group member of a group located at a lower level of the taxonomic hierarchy, to a virtual representative or group member at a higher level.

Embodiments of the present invention solve the business problems described above by facilitating rapid, efficient organization and representation of large numbers of customer records that, in real-world implementations may number in the millions or tens of millions.

Embodiments of the present invention may provide additional benefits in such a real-world implementation that may comprise large numbers of customer-account, service-history, or other types of records. Once an embodiment organizes a subset of the records into a linear or multi-tiered taxonomy, each group of that taxonomy may be represented by a single virtual dynamic representative that identifies business-related characteristics of the entire group. Because the platform-agnostic nature of the present invention allows it to be integrated into existing methods and systems, embodiments may increase efficiency or performance of a customer relations management (CRM) system, a data-warehouse or data mining application, or an other application, system, or business function.

Furthermore, once an embodiment has identified or created a taxonomy, each group of the taxonomy may continue to update itself automatically or dynamically in response to additions, deletions, or updates of records maintained in an associated information repository. This allows a critical characteristic of a group to be updated automatically or dynamically in response to a change in a tracked parameter associated with any member of the group, or in response to a change in the membership of the group that may in turn have been caused by a change to a record stored in one or more repositories. Depending on constraints and goals of a particular embodiment, such automatic or dynamic updating may be performed periodically, according to an other schedule, in response to an occurrence of a condition, or in real-time or near real-time as the contents of the repository are updated.

Embodiments of the present invention provide an other technical advantage by organizing records culled from heterogeneous sources into a coherent and efficient data structure. A taxonomy created by the present invention may comprise records stored on different platforms, in different business units, in different data formats, with different types of data organizations or structures, or with different update schedules or mechanisms. Embodiments may, however, represent a taxonomic analog of a group of those records as a single virtual dynamic record that may conform to a consistent set of conventions, thus hiding complexity and heterogeneity of data that may distributed across a large number of information repositories.

Embodiments may also provide a consistent, embodiment-specific method of characterizing, sorting, and accessing such heterogeneous records. Regardless of differences among key, index, or other access mechanisms used by the repositories, a taxonomy created by an embodiment may provide a standardized indexing, retrieval, or organizational parameters that allow known conventions to be used to analyze relevant characteristics of the underlying data.

For example, even if a large number of customer databases comprise hundreds of application-specific or storage-specific ways to access customer records, a taxonomy created by an embodiment of the present invention may allow access to virtual dynamic representatives as a function of only one vertical parameter (or one set of vertical parameters) deemed to be relevant to a goal of the embodiment.

Embodiments may further provide multi-tiered methods of organizing records into groups by allowing group members to be selected by combinations of vertical parameters that are each assigned a priority or "strength." In one example, vertical parameters may be organized into tiers of the form:

Tier 1 (Strong): a) Social security number, b) Passport ID, c) Corporate ID

Tier 2 (Moderate): a) Address, b) Representative, c) Demographic group

Tier 3 (Weak): a) Race, b) Religion, c) Social network usage

Members of a taxonomic group may that are selected as functions of multiple vertical parameters, may then be chosen as a function of the tiers of each vertical parameter, and that function may comprise associating each tier with a weighting.

Similar tiering may be applied to "horizontal" parameters as a way identifying nuanced methods by which a group's virtual representative may inherit horizontal attributes or characteristics from a group member.

FIG. 1 shows a structure of a computerized account-management apparatus that comprises a computer system, computer program code, communications infrastructure, and stored databases that may be used to implement a method and associated systems for generating a virtual dynamic representative of a taxonomic group with unique inheritance of attributes in accordance with embodiments of the present invention. FIG. 1 refers to objects 101-119.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111, one or more I/O devices 113 and 115, and one or more data warehouses, databases, or other repositories 117 that store searchable records.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for generating a virtual dynamic representative of a taxonomic group with unique inheritance of attributes in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for generating a virtual dynamic representative of a taxonomic group with unique inheritance of attributes.

Any of the components of the present invention could be created, integrated, hosted, maintained, deployed, managed, serviced, supported, etc. by a service provider who offers to facilitate a method for generating a virtual dynamic representative of a taxonomic group with unique inheritance of attributes. Thus the present invention discloses a process for deploying or integrating computing infrastructure, comprising integrating computer-readable code into the computer system 101, wherein the code in combination with the computer system 101 is capable of performing a method for generating a virtual dynamic representative of a taxonomic group with unique inheritance of attributes.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention further communicate, via interface 109, with one or more data warehouses, databases, or information repositories 117 (simply referred to in the remainder of this document, in order to increase readability, as "databases"). These databases 117 may be distributed across geographically distinct sites and may each be connected to one or more database I/O devices 119, such as a terminal, personal computer, transaction-processing front-end, or mobile device.

In embodiments, these data warehouses 117 may store very large databases of records that each describe a customer, a customer account, a vendor or supplier, a resource, or any other entity of interest. In some applications, these databases may be continuously or continually updated by users or by other systems or software applications by means of a database I/O device 119. In some implementations, these databases may include millions or tens of millions of records stored in multiple incompatible storage formats, by multiple applications programs, or on multiple physical or virtual computing platforms. Embodiments of the present invention in such implementations include a means to query and retrieve records from such databases despite any such incompatibilities or other similar factors.

In some embodiments the computer system 101 may access databases 117 by means of a specialized interface. This interface may comprise hardware, software, or both and may be configured to translate queries, access requests, or data-storage requests by the computer system into one or more instruction sets that may be understood by the databases or data warehouses 117.

In one example, databases 117 might store customer records in seven incompatible formats on twelve systems running under four different operating systems. If an embodiment attempts to identify and retrieve all customer records associated with a "21 Main Street" value of a "UserAddress" vertical parameters, the specialized interface might implement this attempted access by generating a set of computer code for each distinct information repository comprised by the databases 117. It would then transmit those sets of code to each database 117 and return the results by means known to those skilled in the art. If the results are returned in incompatible or inconsistent formats, the specialized interface might then reformat the data into a consistent format that may be further processed by the embodiment into one or more homogenous taxonomic groups.

Embodiments of the present invention may be implemented as a method performed by a processor of a computer system, as a computer program product, as a computer system, or as a processor-performed process or service for supporting computer infrastructure.

Figure 2A:
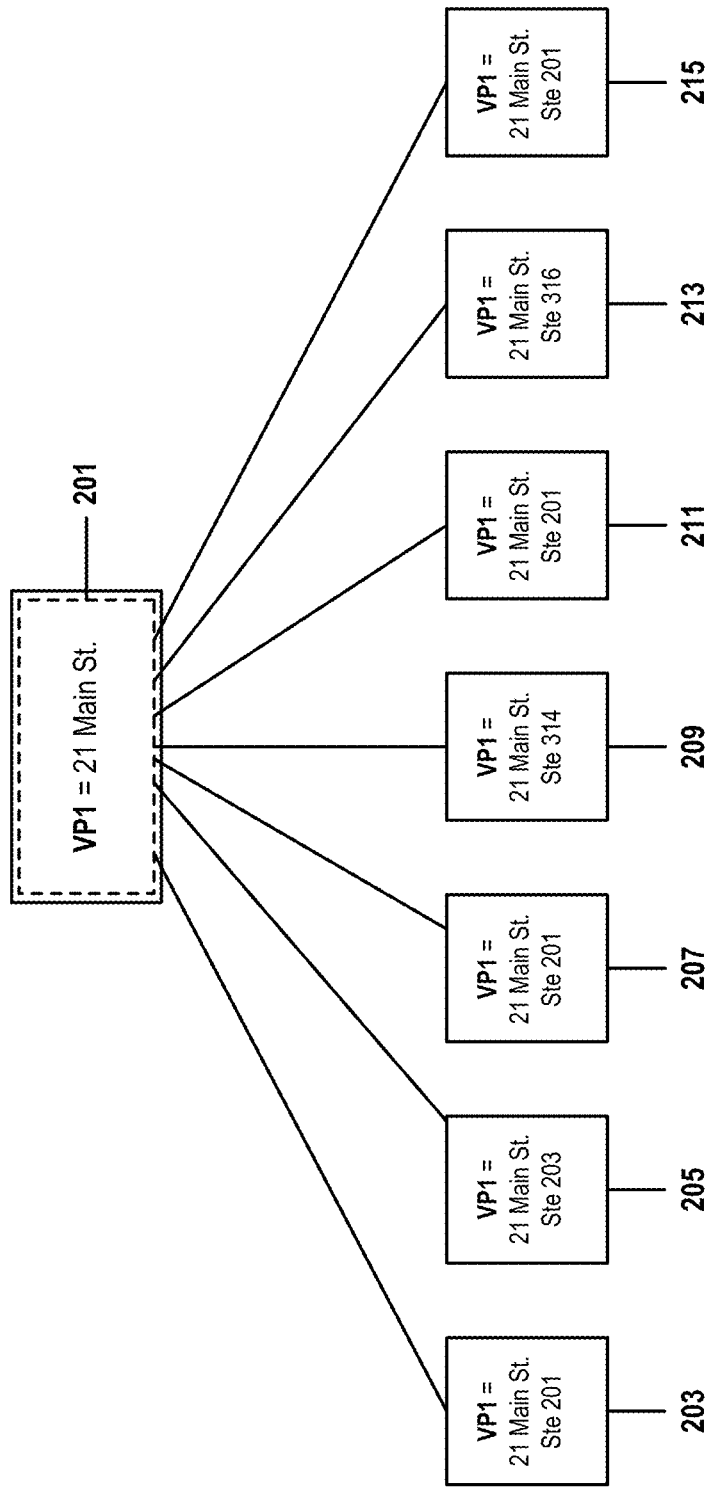
FIG. 2A shows a dynamic data structure that represents a taxonomic group of database records and a virtual dynamic representative that represents the group as a function of inherited optimal characteristics of the group, in accordance with embodiments of the method of the present invention.

FIG. 2A shows a dynamic data structure that represents a taxonomic group of database records and a virtual dynamic representative that represents the group as a function of inherited optimal characteristics of the group, in accordance with embodiments of the method of the present invention. FIG. 2A shows elements identified by reference numbers 201-215.

Elements 203-215 represent records of the distributed database 117 that may be retrieved as a function of a value of a vertical parameter. In the example of FIG. 1, each record represents a customer account and the chosen vertical parameter is an address associated with each customer account. Here, each record is selected as a function of whether it is associated with a value of the vertical parameter that identifies a particular address.

In some embodiments, a different function of this vertical parameter may be used in order to select records. A record might, for example, be selected if it is associated with an address in a particular city or Zip Code, or if it is within a certain distance of the particular address. In another example, a record may be selected if it is associated with an address in a certain neighborhood, or if it is associated with a neighborhood that may be characterized in a certain way, such as by mean home value, residents' average income, or proximity to an airport or shopping mall.

Many other types of vertical parameters may be used instead of, or in addition to, physical address. Records may be chosen as a function of a social security number or a master customer account number, of a demographic characteristic of an account holder, of an account holder's participation in a social network, or of a account executive assigned to an account associated with the record.

In some cases, records may be associated with multiple vertical parameters, and a subset of those records may not identify values of every vertical parameter. In these and other cases, the vertical parameters may be prioritized into tiers and the relative priorities of these parameters may be used to determine which parameter, or subset of parameters, should be used to select records.

In some embodiments, records may be identified or selected by a more complex look-up procedure that would be impossible to implement manually. Such procedures may comprise logical combinations of parameters processed sequentially, simultaneously (by means of concatenated keys), or in a nested manner.

In all cases, a vertical parameter, simple or complex, must be chosen such that it identifies a characteristic, attribute, or trait associated with the selected records. The resulting selected records thus form a taxonomic group, in which all group members share a particular characteristic.

In example of FIG. 2A, all selected member records 203-215 share a characteristic of being associated with a particular physical address (21 Main Street). Thus, the taxonomic group of FIG. 2A may be characterized by the address 21 Main Street. FIG. 2A illustrates how each record 203-215 identifies an account associated with one suite in an office building located at 21 Main Street.

In some cases, records of a taxonomic group need not all be distinct. Redundant or duplicate records may exist due to data-entry errors, multiple customer orders, order-processing problems, use of duplicate channels, or any other means by which a duplicate account may be opened. As will be seen below, embodiments of the present invention address such problems by creating a virtual representative or "moderator" record 201 of the entire taxonomic group 203-215, where characteristics of the virtual representative are not affected by the existence of duplicate group-member records.

Figure 3A:
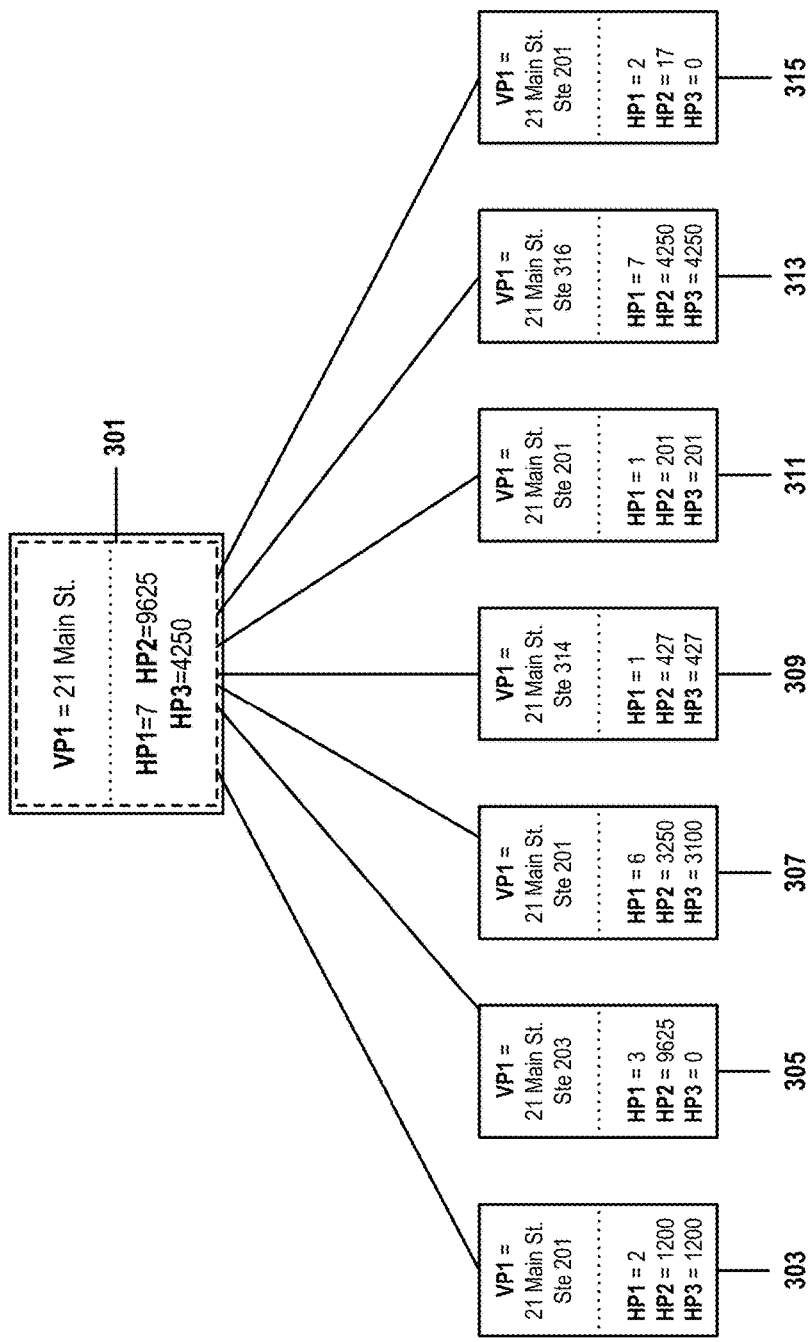
FIG. 3A shows an elaborated version of the taxonomic group of FIG. 2A that illustrates a method of horizontal property inheritance, in accordance with embodiments of the present invention.

As will be seen in FIG. 3A, the virtual moderator 201 will represent the entire taxonomic group 203-215 by inheriting optimal values of "horizontal" parameters associated with group members 203-215. In some embodiments, this virtual moderator may be represented as a new record of a data repository, and this data repository may be one of the repositories from which a record 203-215 was retrieved or is presently stored.

As will be seen below, once the data structure of FIG. 2A is created, the virtual moderator 201 may in some embodiments be dynamically updated every time one or more characteristics of a group-member record 203-215 is updated in a repository in which that record is stored. In some embodiments, the virtual moderator 201 may also be dynamically updated when a new group-member record qualifies or an existing group-member record 203-215 no longer qualifies, as a function of a vertical parameter such as VP1 of FIG. 2A, to be a member of the taxonomic group. In some real-world implementations, such revisions in the membership of a taxonomic group may occur frequently, as records stored in an information repository are revised, added, deleted.

In some embodiments, this updating may be performed on a regular schedule, such as hourly, daily, or monthly. In other embodiments, this updating may be triggered by the occurrence of a condition, such as when a value of a vertical parameter of a record stored in a repository is updated such that the update affects the membership of the record in an existing taxonomic group, or when a value of a horizontal parameter of a record stored in a repository is updated such that the update affects a horizontal parameter of a record in an existing group or of a virtual representative of an existing group.

In summation, FIG. 2A illustrates a taxonomic group 203-215 and a virtual dynamic representative 201 of that group, as created by embodiments of the present invention. The group members 203-215 are selected because they are each associated with a value "21 Main Street" of vertical parameter VP1 and the virtual representative 201 is thus identifies the entire group with the value "21 Main Street" of VP1. As will be seen in FIGS. 3A and 3B, this virtual record 201 will be used to represent the entire group as a single record.

Figure 2B:
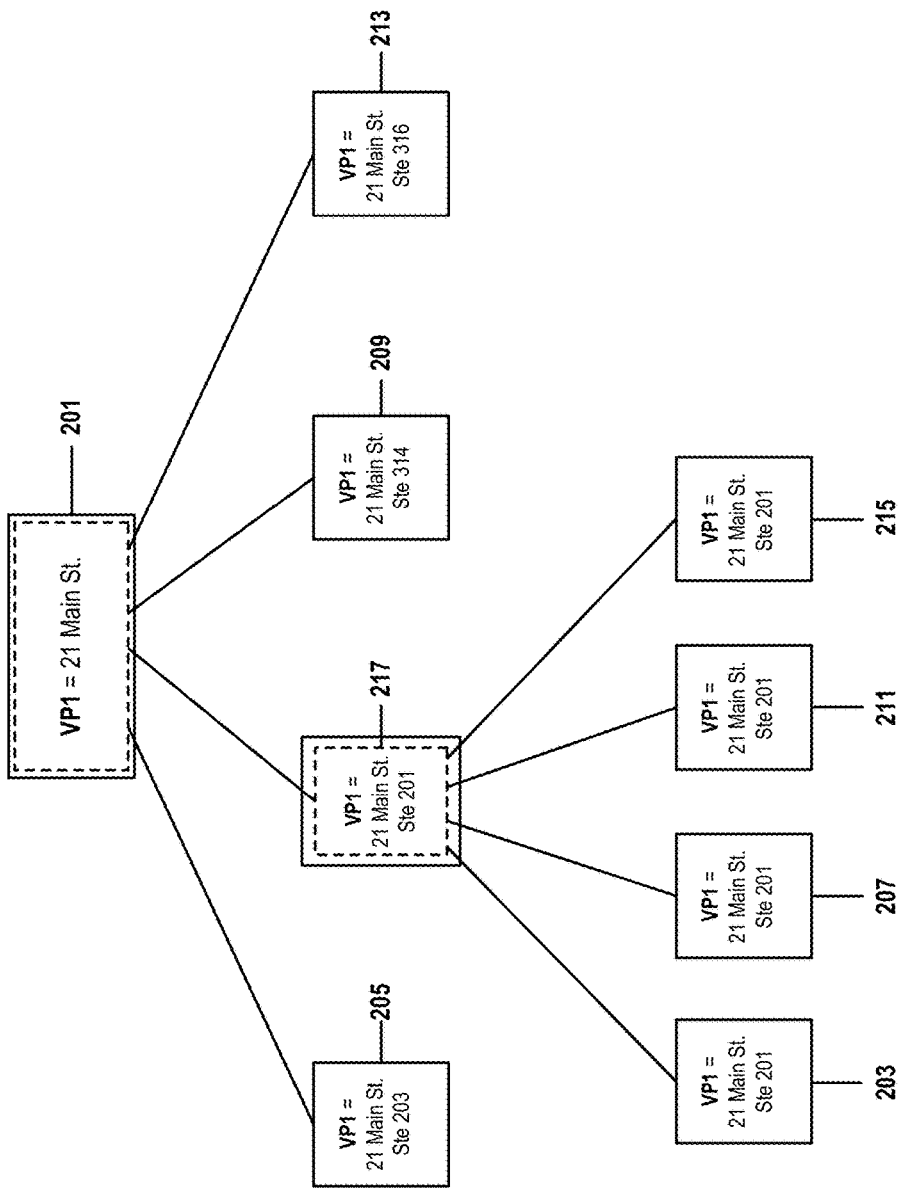
FIG. 2B shows a multi-tiered version of the dynamic data structure of FIG. 2A, in accordance with embodiments of the method of the present invention.

FIG. 2B shows a multi-tiered version of the dynamic data structure of FIG. 2A, in accordance with embodiments of the method of the present invention. FIG. 2B shows elements identified by reference numbers 201-217.

Items 201-215 of FIG. 2B are equivalent in form and function to similarly numbered items of FIG. 2A. As in FIG. 2A, items 203-215 represent a taxonomic group of records selected from one or more external databases, data warehouses, or other information repositories. Each record 203-215 of the group is selected as a function of one or more characteristics related to one or more values of one or more vertical parameters. Furthermore, as in FIG. 2A, item 201 represents a virtual dynamic representative of these records and, in some embodiments, a characteristic of this dynamic representative 201 may vary as attributes of group-member records, or membership of the taxonomic group itself, varies.

FIG. 2B illustrates how taxonomic groups may be nested into a hierarchy, just as taxonomic groups of other sciences may be organized into complex hierarchies of order, genus, and species.

For example, if a goal of an embodiment is to select members of a taxonomic group as a function of an "address" vertical parameter VP1, it may be desirable to select a group 203-215 that is characterized by an attribute or "trait" that comprises an address value of "21 Main Street." Such a group was illustrated in FIG. 2A.

Alternatively, if more granularity is desired, it may instead be desirable to select a group 203, 207, 211, and 215 that is characterized by a finer address value of "21 Main Street, Suite 201." Such a group is illustrated in FIG. 2B, in which an embodiment of the present invention has created a "21 Main Street, Suite 201" virtual dynamic representative 217 of taxonomic group 203, 207, 211, and 215.

In some embodiments, when records of a taxonomic group are identified and selected, previously created virtual dynamic records, such as record 201 or 217, may be included in those selections. In FIG. 2B, for example, when creating a taxonomic group characterized by an address value of "21 Main Street," virtual dynamic record 217 may be selected as part of that group. Here, record 217 is a virtual dynamic representative of all records characterized by the "21 Main Street, Suite 201" address value of vertical parameter VP1. In such a case, it may not be necessary to select subordinate records 203, 207, 211, and 215 because those records are already represented by record 217.

In this manner, the taxonomic group of FIG. 2A may, in FIG. 2B, be streamlined by substituting a single virtual dynamic record 217 for the four records 203, 207, 211, and 215. In both figure, the virtual dynamic representative 201 of address "21 Main Street" is identical.

Similarly, the entire taxonomic group of records 203-215 may itself be nested within an even more broadly characterized taxonomic group by representing the records 203-215 as a single virtual member 201 of the more broadly characterized group. In this way, large numbers of records may be consolidated into a small, efficient structure, and this structure is scalable to as many nested hierarchical levels as may be desired.

In some embodiments, each virtual dynamic representative, such as item 201 or 217, may be linked to the records it represents such that changes in those represented records are automatically reflected in the virtual representative. In such cases, if a new record is added to a database such that that record qualifies as a member of a taxonomic group, the virtual representative of that group may be automatically or dynamically updated to reflect the effect of the creation of that new record. Similarly, if an existing member of a taxonomic group is revised or deleted, the virtual representative of that group would be automatically or dynamically updated to reflect that revision or deletion. In embodiments that allow groups to be organized into complex nested, hierarchical, or other types of structures, an effect of such an automatic or dynamic updating might in turn automatically or dynamically ripple throughout an entire taxonomy of such structures.

In the example of FIG. 2, virtual dynamic representative 201 represents a taxonomic group characterized by an association with an address value of "21 Main Street." This group comprises real records 205, 209, and 213 and virtual dynamic record 217. Virtual dynamic record 217 in turn represents a taxonomic subgroup characterized by an association with an address value of "21 Main Street, Suite 201," where that subgroup contains records 203, 207, 211, and 215, each of which is associated with an address value of "21 Main Street, Suite 201."

In some embodiments, a taxonomic group may comprise more than one virtual dynamic representative of a subgroup.

FIG. 3A shows an elaborated version of the taxonomic group of FIG. 2A that illustrates a method of horizontal property inheritance, in accordance with embodiments of the present invention. FIG. 3A includes items 301-315.

Items 301-315 are analogous in form and function to respective items 201-215 of FIG. 2A. As did items 201-215 in FIG. 2A, items 301-315 represent a taxonomic group of stored records that is characterized by an address value of "21 Main Street" of vertical parameter VP1.

Unlike FIG. 2A, however, FIG. 3A shows that records 301-315 are each associated with a record-specific first set of values of horizontal parameters HP1, HP2, and HP3.

As will be described below, embodiments of the present invention use and manipulate horizontal parameters in a manner different from the way that embodiments use and manipulate vertical parameters. It is possible, however, that different embodiments, or different implementations of a same embodiment, may use different rules to decide which characteristics or attributes associated with database records are "vertical" and which are "horizontal." A vertical parameter of a first embodiment, for example, might be a horizontal parameter of a second embodiment. And a horizontal parameter of one embodiment might comprise a sub-parameter that is identified as a vertical parameter by yet another embodiment.

Rules by which horizontal and vertical parameters are selected and distinguished from each other in a particular embodiment or implementation may be chosen as a function of hardware, software, platform, or resource constraints, or may be selected in order to satisfy a particular requirement or intent of the embodiment.

In general, a vertical parameter identifies a characteristic common to all members of a taxonomic group and is used to select members of that group and to characterize a virtual dynamic representative of the entire group. Although not always true, vertical parameters often identify an immutable or infrequently varying characteristic of an entity associated with a record, such as a mailing address, a social security number, an account number, or an interest in products related to a particular genre.

A horizontal parameter, on the other hand, is often (although not always) a behavioral or other characteristic of a record-associated entity that is of interest to parties or applications in making a decision. Values of such parameters may vary more often than would a value of a vertical parameter and, like vertical parameters, horizontal parameters may be prioritized by importance into tiers and the relative priorities of records may be a factor in determining how attributes are inherited.

Figure 3B:
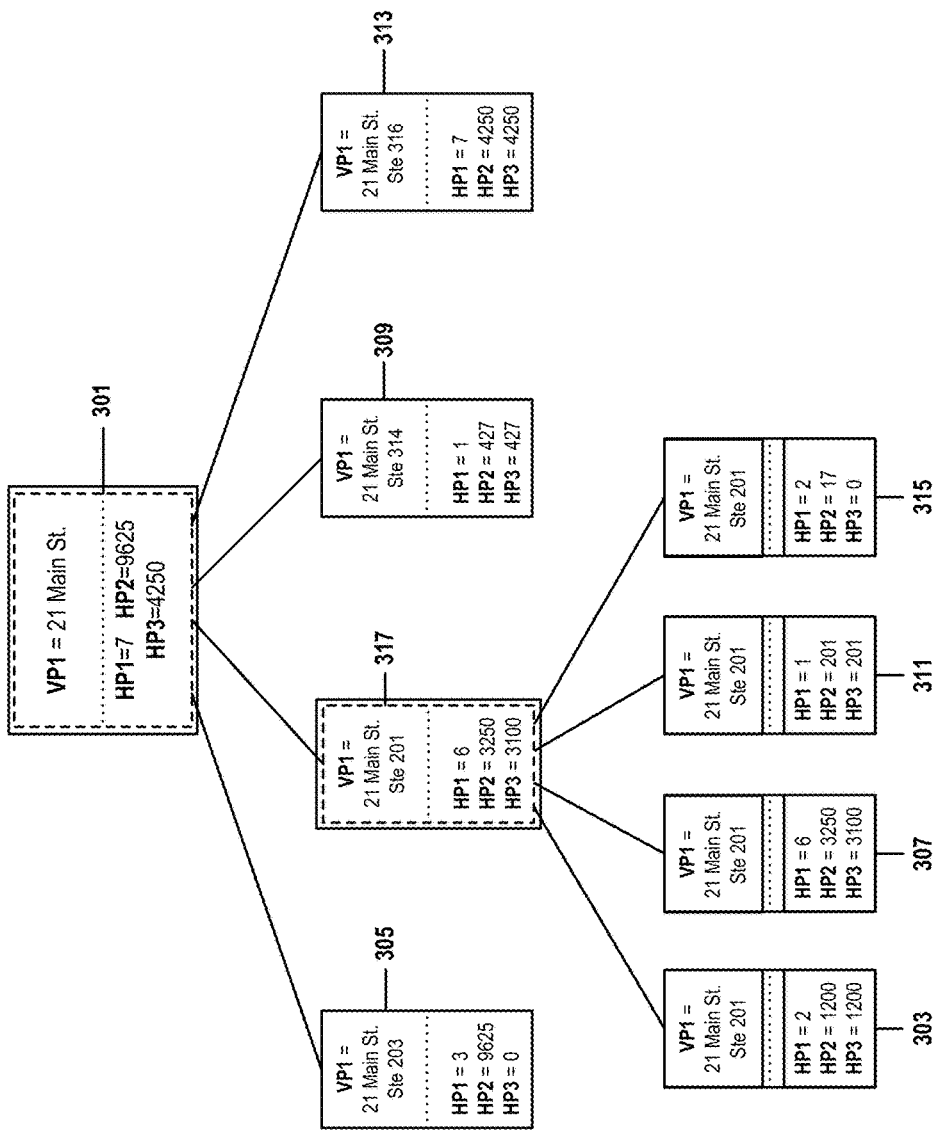
FIG. 3B shows an elaborated version of the multi-tier taxonomic group of FIG. 2B that illustrates a method of horizontal property inheritance, in accordance with embodiments of the present invention.

In the example of FIGS. 3A and 3B, three horizontal parameters, HP1, HP2, and HP3, are associated with each database record 303-315 and with each virtual dynamic representative record 301 and 317. For purposes of this example, each record is deemed to represent a customer account, although in other embodiments, records may represent any other type of data items associated with a particular embodiment that may be represented by data structures described in the figures.

In this example, a value of HP1 associated with a record identifies a number of years that a corresponding customer account has been active. A value of HP2 represents the largest single purchase credited to that account. And a value of HP3 represents the largest purchase credited to that account during the last twelve months. In FIG. 3A, for example, record 307 identifies that an account associated with 21 Main Street, Suite 201 has been open for six years, that the largest purchase made by that account was for $3250, and that the largest purchase made by that account in the last year was $3100.

As in FIG. 2A, records 303-315 have been selected as a function of the fact that each one is associated with a "21 Main Street" value of "address" vertical parameter VP1; and virtual record 301 has been created and configured to represent the entire group of "21 Main Street" records 303-315.

Embodiments of the present invention aggregate values of a horizontal parameter that are associated with members of a taxonomic group, and associate the most desirable value of this aggregation with the virtual dynamic representative of that group. In some cases, a most desirable value may be a value that is the largest, smallest, largest in magnitude, or smallest in magnitude of the aggregated values. In other cases, a most desirable value may be selected by more complex functions, and these functions may comprise extrinsic factors.

For example, in an implementation that identifies monthly sales volume as a horizontal parameter, identifying a most desirable monthly sales volume may require weighting each value as a factor of a month in which the sales figures were recorded, in order to eliminate bias caused by seasonal or holiday-related fluctuations in industry-wide sales figures.

In other cases, a value of one horizontal or vertical parameter or sub-parameter may alter a way in which a most desirable value is selected from an aggregated first set of values of an other horizontal parameter. For example, if each record of a taxonomic group represents an account opened in a different country, sales figures associated with those records may be weighted to compensate for differences in each country's strength of currency, size of market, or locally available product lines.

In the example of FIG. 3A, most desirable values of horizontal parameters HP1-HP3 are selected by a relatively simple maximum-value function. The most desirable value of HP1, for example, is "6," which represents that the customer account of record 307 has been active for six years, longer than any account of records 303, 305, 309, 311, 313, or 315.

Similarly, the most desirable value of HP2 is "9625," culled from record 305 and representing that the customer associated with record 305 made a $9625 purchase that is larger than any purchase of any other customer in the group 303-315. The most desirable value of horizontal parameter HP3 is "4250," which is aggregated from record 313.

As shown in FIG. 3A, these three most desirable, or optimal, values are inherited and associated with the virtual dynamic representative 301. In this way, all members of the taxonomic group 303-315 are represented by a single virtual customer 301 that identifies characteristics of customers associated with the address "21 Main Street." Depending on specific goals and intent of a particular embodiment, this virtual representative may allow an other application, system, or business function to retrieve relevant decision-making information by reading and analyzing only one record (the virtual dynamic record 301), rather than the seven records 303-315.

If, for example, an application is searching for locations in which accounts are less than ten years old, that application need only refer to virtual dynamic record 301, rather than retrieve and analyze all seven records 303-315. Because virtual record 301 may be updated dynamically, once this data structure is created, it may be automatically or dynamically updated every time a data repository of candidate records is updated.

FIG. 3B shows an elaborated version of the multi-tier taxonomic group of FIG. 2B that illustrates a method of horizontal property inheritance, in accordance with embodiments of the present invention. FIG. 3B includes items 301-317.

Items 301-315 are analogous in form and function to respective items 201-215 of FIG. 2B. Like items 201-215 in FIG. 2B, items 301-315 represent a multi-tiered taxonomic group of stored records that is characterized by an address value of "21 Main Street" of vertical parameter VP1. Similarly, like item 217 of FIG. 2B, item 317 represents a virtual dynamic representation of a taxonomic subgroup of items 303, 307, 311, and 315, all of which are characterized by an address value of "21 Main Street, Suite 201" of vertical parameter VP1.

Like FIG. 3A, FIG. 3B here shows that records 301-317 are each associated with a record-specific first set of values of horizontal parameters HP1, HP2, and HP3. Record 305, for example, relates a customer account associated with a "21 Main Street, Suite 203" address with an account duration of three years, a maximum prior purchase of $9625, and an empty purchase history over the previous year.

In a manner analogous to the horizontal-attribute inheritance properties of FIG. 3A, virtual dynamic record 301 here inherits the most desirable values of each horizontal parameter aggregated from members of record 301's corresponding group (items 305, 309, 313, and 317). The fact that record 317 is itself a virtual representative of a subgroup does not alter this method. If, for example, record 317 had been associated with an HP1 value of "9," virtual record 301 would have inherited this new most-desirable-value and would be associated with an HP1 value of "9."

Similarly, the most desirable aggregated horizontal attributes (that is, the most desirable values of horizontal parameters HP1, HP2, and HP3) of subgroup records 303, 307, 311, and 315 are inherited by virtual dynamic representative 317 of the "21 Main Street, Suite 201" subgroup.

In the example of FIG. 3B, therefore, a two-group taxonomy of customer records comprises a higher-level taxonomic group of records 305, 309, 313, and 317, and this higher-level group is represented by a single virtual dynamic record 301. Record 317, in turn, is a virtual dynamic representative of a lower-level taxonomic subgroup of records 303, 307, 311, and 315. The higher-level group is associated with a vertical VP1 "address" attribute of "21 Main Street," and the nested lower-level subgroup is associated with a narrower VP1 attribute of "21 Main Street, Suite 201."

As can be seen in FIG. 3B, virtual record 301 inherits the most desirable horizontal values of its group-member records 305, 309, 313, and 317: a seven-year account duration, a $9625 maximum purchase, and a $4250 maximum purchase during the previous year. Note that these inherited horizontal attributes are identical to those of record 301 in FIG. 3A. The hierarchical, nested arrangement of records in FIG. 3B should not alter the horizontal attributes of virtual dynamic representative record 301 that were inherited by virtual record 301 in the linear, single-level organization of records of FIG. 3A.

Similarly, virtual record 317 inherits horizontal attributes from records 303, 307, 311, and 315 of the taxonomic subgroup that record 317 represents. Because both virtual records 301 and 317 may be dynamically updated, every time a record of one or more of the information repositories is added, deleted, or updated, an effect of those changes may be automatically or dynamically rippled throughout a linear or hierarchical taxonomy similar to those shown in the figures.

If, for example, an account associated with record 311 is credited with a $10,000 purchase, subgroup member 311 will be associated with an updated "10000" value of horizontal parameter HP3, and this new value will become the most desirable HP3 value of the subgroup. The HP3 horizontal attribute of virtual dynamic representative 317 of record 311 will then automatically be updated with this new "10000" most-desirable value of HP3. And, because record 317 will then be associated with the most desirable value of HP3 of the higher-level group's records, the most-desirable value of HP3 associated with higher-level virtual record 301 will also be updated to a value of "10000." In this manner, a change to any record will, in some embodiments, automatically ripple through an entire taxonomy.

In some embodiments, the dynamic nature of this method may require each record of a subgroup to be updated by means known to those skilled in the art prior to attempting to allow a higher group to inherit attributes of a virtual representative of that subgroup. In the preceding example, that might mean that, before attempting to identify the inherited horizontal attributes of higher-level virtual record 301 in a nested or hierarchical taxonomy, an embodiment of the present invention might first be required to identify the inherited horizontal attributes of subgroup virtual record 317.

Figure 4:
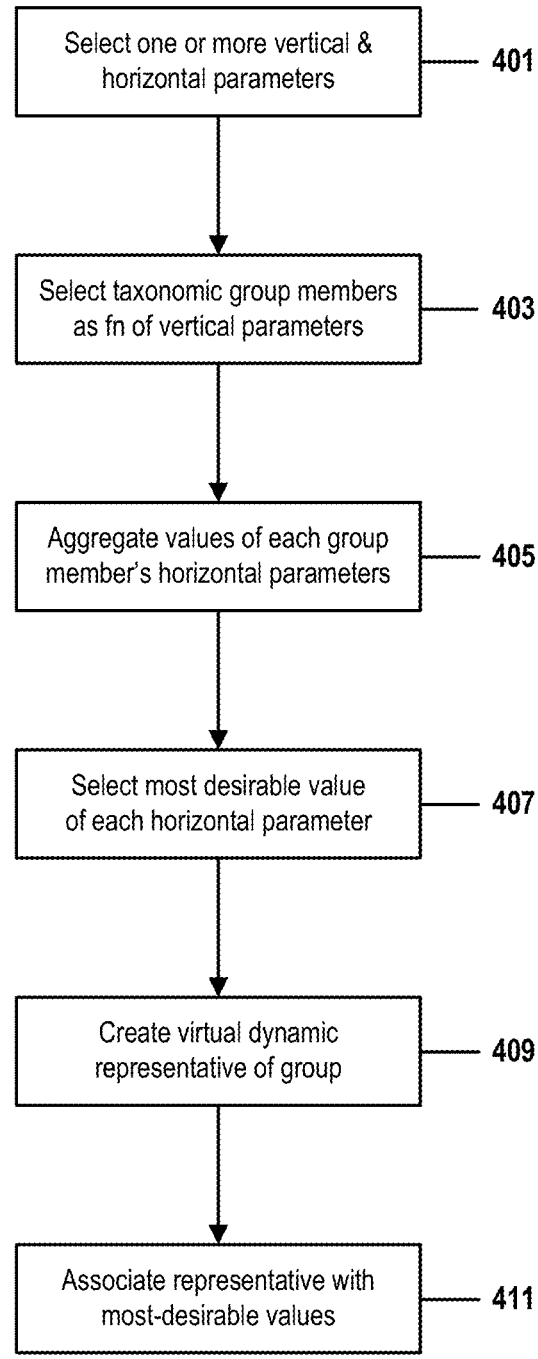
FIG. 4 is a flow chart that illustrates methods for generating a virtual dynamic representative of a taxonomic group with unique inheritance of attributes in accordance with embodiments of the present invention.

FIG. 4 is a flow chart that illustrates methods for generating a virtual dynamic representative of a taxonomic group with unique inheritance of attributes in accordance with embodiments of the present invention. FIG. 4 comprises steps 401-411.

In step 401, a computerized account-management system, as described above, selects one or more vertical parameters and one or more horizontal parameters. These parameters may be selected by any means known to those skilled in the art such that they satisfy the requirements described in this document.

A vertical parameter is one that identifies a characteristic of an entity associated with a record stored in an information repository. This characteristic may be used to select records to be organized into a taxonomic group. A vertical parameter might, for example, identify a customer account number such that all customer records associated with a particular account number are organized into a single group.

In some embodiments, as described by the preceding figures, two or more vertical parameters may be prioritized into tiers and a record may be added to a group as a function of values of two or more vertical parameters associated with the record, or as a function of the tiers associated with the parameters.

As previously discussed, a horizontal parameter identifies horizontal attributes, characteristics, or other information associated with each record of a taxonomic group created by an embodiment of the present invention. These horizontal attributes identify information upon which a business decision or other goal of the embodiment may be based.

In one example, a horizontal parameter might identify how often an associated customer has made purchases through a particular channel. If a goal of an implementation of the present invention is to determine the cost-effectiveness of marketing through that channel to a particular demographic, an embodiment of the present invention might select members of a taxonomic group that are associated with the demographic and then consider values of the horizontal parameter associated with each member of that group.

In step 403, the system creates a taxonomic group as a function of one or more of the vertical parameters selected in step 401, as described above.

If a taxonomic group associated with the vertical parameters already exists, the system might here merely update that group by applying equivalent selection criteria to the latest, current versions of the one or more information repositories. Such an update might involve adding or deleting members of the group, or revising a value of a horizontal parameter associated with a record of the group.

In step 405, the system aggregates horizontal attributes associated with all members of the group. In embodiments, this entails creating a first set of values for each relevant horizontal parameter, where each set contains the values of one horizontal parameter associated with every record of the group.

In step 407, the system selects a most desirable value from each first set of values aggregated in step 405. A most desirable value is selected by means of criteria that may be implementation-dependent or that may be a function of a goal of the embodiment. As described in the figures above, if, for example, a goal of an embodiment is to determine whether a taxonomic group includes the newest member accounts, a most-desirable value of a horizontal parameter that identifies account age might be the lowest value of the aggregated set associated with that parameter.

At the conclusion of step 407, the system will have assembled a group of records as a function of one or more vertical parameters and will have identified a most-desirable value of each of one or more horizontal parameters, where each of the most desirable values is associated with one or more members of the group.

In step 409, the system creates a new "virtual" record that represents the entire taxonomic group created in step 403. This representative record is associated with one or more values of the vertical parameters used to select group members in step 403.

In one example, if group members were selected in step 403 as a function of a vertical parameter that identifies an account's billing mechanism, the resulting taxonomic group might comprise records associated with one class of credit-card payments. In such a case, the virtual representative created in step 409 would be associated with that class of credit-card payments, indicating that the taxonomic group contains records characterized by such a payment method.

In step 411, the virtual dynamic representative record created in step 409 is associated with the most-desirable horizontal attributes selected in step 407. In the preceding example, if a group consists of three records, and those records are respectively associated with values of the account-age horizontal parameter of "3 years," "4 years," and "6 months," the system would select the "6 months" value as being the group's most-desirable (that is, shortest) value of the account-age parameter, and in step 411, the virtual representative would inherit that "6 month" value of the account-age horizontal parameter from the group.

The virtual representative, as described in earlier figures, is dynamic. This means that, as group members are updated, added, or deleted, characteristics of the virtual representative, such as the horizontal attributes associated with the virtual representative are in turn updated. In other words, once a taxonomic group is created, its virtual dynamic representative will automatically continue to accurately represent characteristics of the group each time the group membership is updated.

At the conclusion of step 411, the system will have selected records from one or more information repositories as a function of one or more vertical parameters, will have assembled the selected records into a taxonomic group, will have identified the most-desirable values of each horizontal parameter associated with any group members, will have created with a single virtual dynamic representative of the entire group, will have associated that representative with one or more values of the vertical parameters that characterize the entire group, and will have further associated the virtual representative with each of the most-desirable values.

In more complex embodiments, as shown in FIGS. 2B and 3B, the system may generate two or more such taxonomic groups, each with its own virtual representative. Those groups may then be nested, assembled into a hierarchy or graph, or otherwise arranged such that a virtual representative of a lower-level group is selected as a group member of a higher-level group. In such cases, the vertical and horizontal attributes associated with the selected lower-level virtual representative may be inherited by a virtual representative of the higher-level group.

Once a complex taxonomies of this nature is generated by an embodiment of the present invention, revisions to membership of any group of the taxonomy may be automatically rippled through higher-levels of the taxonomy.

What is claimed is:

1. A computerized account-management apparatus comprising a computer processor, a memory coupled to the processor, a computer-readable hardware storage device coupled to the processor, and a specialized interface to an account-management system, such that the interface allows the apparatus to access a continuously updated database of account records, and wherein the storage device contains program code configured to be run by the processor via the memory to implement a method for generating a virtual dynamic representative of a taxonomic group with unique inheritance of attributes, the method comprising:

the apparatus identifying a first vertical parameter and a first horizontal parameter, wherein each record of the database of account records is capable of identifying a value of the first vertical parameter and a value of the first horizontal parameter;

the apparatus retrieving a first subset of records from the database as a function of the first vertical parameter;

the apparatus assembling a first set of values of the first horizontal parameter, wherein each value of the first set of values is associated with a record of the first subset of records;

the apparatus selecting a first most desirable value of the first horizontal parameter from the first set of values;

the apparatus creating a first virtual record that represents the first subset of records; and the apparatus configuring the first virtual record to identify a first value of the first vertical parameter and to further identify the first most desirable value.

2. The apparatus of claim 1, further comprising:

the apparatus identifying a second vertical parameter, wherein each record of the database of account records is capable of identifying a value of the second vertical parameter;

the apparatus retrieving a second subset of records from the database as a function of the second vertical parameter, wherein the second subset comprises no record of the first subset of records;

the apparatus adding the first virtual record to the second subset of records;

the apparatus assembling a second set of values of the first horizontal parameter, wherein each value of the second set of values is associated with a record of the second subset of records;

the apparatus selecting a second most desirable value of the first horizontal parameter from the second set of values;

the apparatus creating a second virtual record that represents the second subset of records; and the apparatus configuring the second virtual record to identify a second value of the second vertical parameter and to further identify the second most desirable value.

3. The apparatus of claim 2, further comprising:

the apparatus confirming that the first virtual record accurately represents a current state of the first subset of records in the database before adding the first virtual record to the second subset.

4. The apparatus of claim 2, wherein the second vertical parameter is the first vertical parameter.

5. The apparatus of claim 2, wherein each record of the first subset identifies the first value of the first vertical parameter and each record of the second subset identifies the second value of the second vertical parameter.

6. The apparatus of claim 2, wherein the second vertical parameter comprises two or more sub-parameters, and wherein the two or more sub-parameters comprise the first vertical parameter.

7. The apparatus of claim 5, wherein the two or more sub-parameters are organized by importance into prioritized tiers.

8. The apparatus of claim 1, wherein each record of the database represents a customer account.

9. The apparatus of claim 1, wherein a value of the first horizontal parameter represents a characteristic of a record of the continuously updated database that may be used to make a business decision.

10. A method for generating a virtual dynamic representative of a taxonomic group with unique inheritance of attributes, the method comprising:

a computerized account-management apparatus identifying a first vertical parameter and a first horizontal parameter, wherein the apparatus comprises a computer processor, a memory coupled to the processor, a computer-readable hardware storage device coupled to the processor, and a specialized interface to an account-management system, such that the interface allows the apparatus to access a continuously updated database of account records, and wherein the storage device contains program code configured to be run by the processor via the memory to implement a method, and wherein each record of the database of account records is capable of identifying a value of the first vertical parameter and a value of the first horizontal parameter;

the apparatus retrieving a first subset of records from the database as a function of the first vertical parameter;

the apparatus assembling a first set of values of the first horizontal parameter, wherein each value of the first set of values is associated with a record of the first subset of records;

the apparatus selecting a first most desirable value of the first horizontal parameter from the first set of values;

the apparatus creating a first virtual record that represents the first subset of records; and the apparatus configuring the first virtual record to identify a first value of the first vertical parameter and to further identify the first most desirable value.

11. The method of claim 10, further comprising:

the apparatus identifying a second vertical parameter, wherein each record of the database of account records is capable of identifying a value of the second vertical parameter;

the apparatus retrieving a second subset of records from the database as a function of the second vertical parameter, wherein the second subset comprises no record of the first subset of records;

the apparatus adding the first virtual record to the second subset of records;

the apparatus assembling a second set of values of the first horizontal parameter, wherein each value of the first set of values is associated with a record of the second subset of records;

the apparatus selecting a second most desirable value of the first horizontal parameter from the second set of values;

the apparatus creating a second virtual record that represents the second subset of records; and the apparatus configuring the second virtual record to identify a second value of the second vertical parameter and to further identify the second most desirable value.

12. The method of claim 11, further comprising:
the apparatus confirming that the first virtual record accurately represents a current state of the first subset of records in the database before adding the first virtual record to the second subset.

13. The method of claim 11, wherein each record of the first subset identifies the first value of the first vertical parameter and each record of the second subset identifies the second value of the second vertical parameter.

14. The method of claim 11, wherein a value of the first horizontal parameter represents a characteristic of a record of the continuously updated database that may be used to make a business decision.

15. The method of claim 11, further comprising providing at least one support service for at least one of creating, integrating, hosting, maintaining, and deploying computer-readable program code in the computer system, wherein the computer-readable program code in combination with the computer system is configured to implement the identifying, retrieving, assembling, selecting, creating, and configuring.

16. A computer program product, comprising a computer-readable hardware storage device having a computer-readable program code stored therein, the program code configured to be executed by a computerized account-management apparatus to implement a method for generating a virtual dynamic representative of a taxonomic group with unique inheritance of attributes, wherein the apparatus comprises a computer processor, a memory coupled to the processor, a computer-readable hardware storage device coupled to the processor, and a specialized interface to an account-management system, such that the interface allows the apparatus to access a continuously updated database of account records, the method comprising:
the computerized account-management apparatus identifying a first vertical parameter and a first horizontal parameter, wherein the storage device contains program code configured to be run by the processor via the memory to implement a method, and wherein each record of the database of account records is capable of identifying a value of the first vertical parameter and a value of the first horizontal parameter;
the apparatus retrieving a first subset of records from the database as a function of the first vertical parameter;
the apparatus assembling a first set of values of the first horizontal parameter, wherein each value of the first set of values is associated with a record of the first subset of records;
the apparatus selecting a first most desirable value of the first horizontal parameter from the first set of values;
the apparatus creating a first virtual record that represents the first subset of records; and
the apparatus configuring the first virtual record to identify a first value of the first vertical parameter and to further identify the first most desirable value.

17. The computer program product of claim 16, further comprising:
the apparatus identifying a second vertical parameter, wherein each record of the database of account records is capable of identifying a value of the second vertical parameter;
the apparatus retrieving a second subset of records from the database as a function of the second vertical parameter, wherein the second subset comprises no record of the first subset of records;
the apparatus adding the first virtual record to the second subset of records;
the apparatus assembling a second set of values of the first horizontal parameter, wherein each value of the first set of values is associated with a record of the second subset of records;
the apparatus selecting a second most desirable value of the first horizontal parameter from the second set of values;
the apparatus creating a second virtual record that represents the second subset of records; and
the apparatus configuring the second virtual record to identify a second value of the second vertical parameter and to further identify the second most desirable value.

18. The computer program product of claim 17, further comprising:
the apparatus confirming that the first virtual record accurately represents a current state of the first subset of records in the database before adding the first virtual record to the second subset.

19. The computer program product of claim 17, wherein each record of the first subset identifies the first value of the first vertical parameter and each record of the second subset identifies the second value of the second vertical parameter.

20. The computer program product of claim 17, wherein a value of the first horizontal parameter represents a characteristic of a record of the continuously updated database that may be used to make a business decision.

* * * * *